US006651021B2

United States Patent
Underbrink et al.

(10) Patent No.: US 6,651,021 B2
(45) Date of Patent: Nov. 18, 2003

(54) SYSTEM USING ADAPTIVE CIRCUITRY TO IMPROVE PERFORMANCE AND PROVIDE LINEARITY AND DYNAMIC RANGE ON DEMAND

(75) Inventors: Paul A. Underbrink, Lake Forest, CA (US); Daryush Shamlou, Laguna Niguel, CA (US); Ricke W. Clark, Irvine, CA (US); Joseph H. Colles, Bonsall, CA (US); Guangming Yin, Foothill Ranch, CA (US); Patrick D. Ryan, Yorba Linda, CA (US); Kelly H. Hale, Aliso Viejo, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 8 days.

(21) Appl. No.: 09/881,932

(22) Filed: Jun. 15, 2001

(65) Prior Publication Data

US 2002/0193958 A1 Dec. 19, 2002

(51) Int. Cl.$^7$ .............................................. G01R 35/00
(52) U.S. Cl. ........................ 702/107; 702/69; 702/75; 702/122; 330/310; 330/311; 330/278; 330/285
(58) Field of Search ........................... 702/69, 75, 122, 702/107; 330/2, 310, 311, 278, 285; 375/132; 348/426.1, 300

(56) References Cited

U.S. PATENT DOCUMENTS 3,706,933 A * 12/1972 Bidell et al. ................. 375/149
5,321,851 A * 6/1994 Sugayama et al. ....... 455/161.3

* cited by examiner

Primary Examiner—John Barlow
Assistant Examiner—Meagan Walling
(74) Attorney, Agent, or Firm—Weide & Miller, Ltd.

(57) ABSTRACT

The invention discloses a system for improving performance of the RF amplification stage of communication receivers by accounting for the signal environment of the RF amplifier. The linearity, gain and power supply voltage of the RF amplification stage of the communication receiver is adjusted to produce an optimal signal into the succeeding narrow-band amplification stage(s). The adjustment of the RF stage includes mechanisms such as adjusting the RF amplifier power supply level using a DC to DC converter. It also includes allowing distortion in the RF amplification stage if the distortion in the RF amplification stage does not affect the target signal. For example, if there were a strong signal that fell within the same band as the target signal, amplification would be allowed to be so high that it distorted the undesired signals, but not the tined signals. If the desired signal is the predominant signal, within the RF amplifier's band, then the amplifier gain may be increased only to the point where distortion is detected.

6 Claims, 6 Drawing Sheets

US 6,651,021 B2

1

SYSTEM USING ADAPTIVE CIRCUITRY TO IMPROVE PERFORMANCE AND PROVIDE LINEARITY AND DYNAMIC RANGE ON DEMAND

BACKGROUND OF THE INVENTION

1. Field of the Invention

This invention relates to communications devices that receive electronic communication transmissions and in particular to personal communications systems, processes and devices that minimize power consumption by adjusting amplifier linearity and dynamic range.

2. Related Art

Portable electronic devices have become part of many aspects of personal, business, and recreational activities and tasks. The popularity of various portable personal electronic communications systems, such as portable phones, portable televisions, and personal pagers, continues to increase. As the popularity of portable electronic systems has increased, so has the demand for smaller, lighter, and more power efficient devices.

Amplification of received electronic signals is a function performed in many portable electronic systems. Amplification circuitry tend to dissipate significant amounts of power and generate significant amounts of heat. It is common practice to design the Radio Frequency (RF) amplification portion of receiver circuitry within portable electronic communication devices to worse case, or one amplifier fits all, signal environment design standards. These standards dictate that the "front end" RF amplifier be designed as a compromise between maximum amplification, and preserving linearity of nearby transmissions that are being received.

Designing receiver circuitry to worse case design standards is common for several reasons. First, receiver amplifiers are designed to worst case specifications because manufacturers generally want their receiving device to have the maximum range possible without distorting the received signal of a nearby transmission. If a portable communication device has a greater range than a competing model, a significant marketplace advantage is obtained. If the communications receiver distorts nearby transmissions, however, it may be perceived as being of inferior quality.

Traditionally, power savings in receiver design has received secondary emphasis in the design of portable electronics equipment. More design effort has been expended on the broadcast portions of portable communication devices because the broadcast portions of the electronics generally consume considerably more power than the receiver circuitry. Because of this higher power consumption, improving the power consumption of the broadcast may realize significant power savings. Conversely, the receiver circuitry consumes less power. Therefore, reducing the power requirements of the receiver results in less improvement. However, if RF amplifiers for the receiver circuitry could be designed to optimally amplify the signals within their bands, amplification of received signals could be accomplished more efficiently and performance improvements could be realized.

SUMMARY

This invention addresses problems related to power consumption by dynamically adjusting the gain, range, and linearity of the receiving amplifier. The adjustment of the RF amplifier is based on the desired signal received and what

2 portion of the overall signal the desired signal comprises. By optimally amplifying the desired signal received while minimizing power consumption, the optimal amplification is achieved.

A front end communication amplifier amplifies a band of radio signals that are received by an antenna. The amplified band of signals are then downconverted. The desired signal is extracted from the band of signals and amplified prior to demodulating and decoding the information in the signal. The circuits that amplify the RF Signal are commonly designed for worst case performance, so the RF amplifier stage is designed for maximum gain and maximum linearity, even though the signal being received may not require maximum gain or linearity. The RF amplifier commonly stays in a maximum gain, maximum linearity mode even though the signal being received could be better amplified by changing the parameters of the amplifier.

For example, it is desirable to amplify the signal intended to be received as much as possible in the front end, or RF amplification stages. Applying amplification at the front end is desirable because the farther down the amplification chain that a signal is amplified, generally the noisier the signal becomes. It is therefore usually advantageous to amplify a signal as much as possible in the front end of the amplification chain. Significant performance improvements of the receiving portion communications receiving devices are available if the parameters of the front end RF amplifier are tailored to the signal environment. Because of the performance improvement available there is a need for improved front end amplification control in communications receivers.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention can be better understood with reference to the following figures. The components in the figures are not necessarily to scale, emphasis instead being placed upon illustrating the principles of the invention. Moreover, in the figures, like reference numerals designate corresponding parts throughout the different views

DETAILED DESCRIPTION

Figure 1:
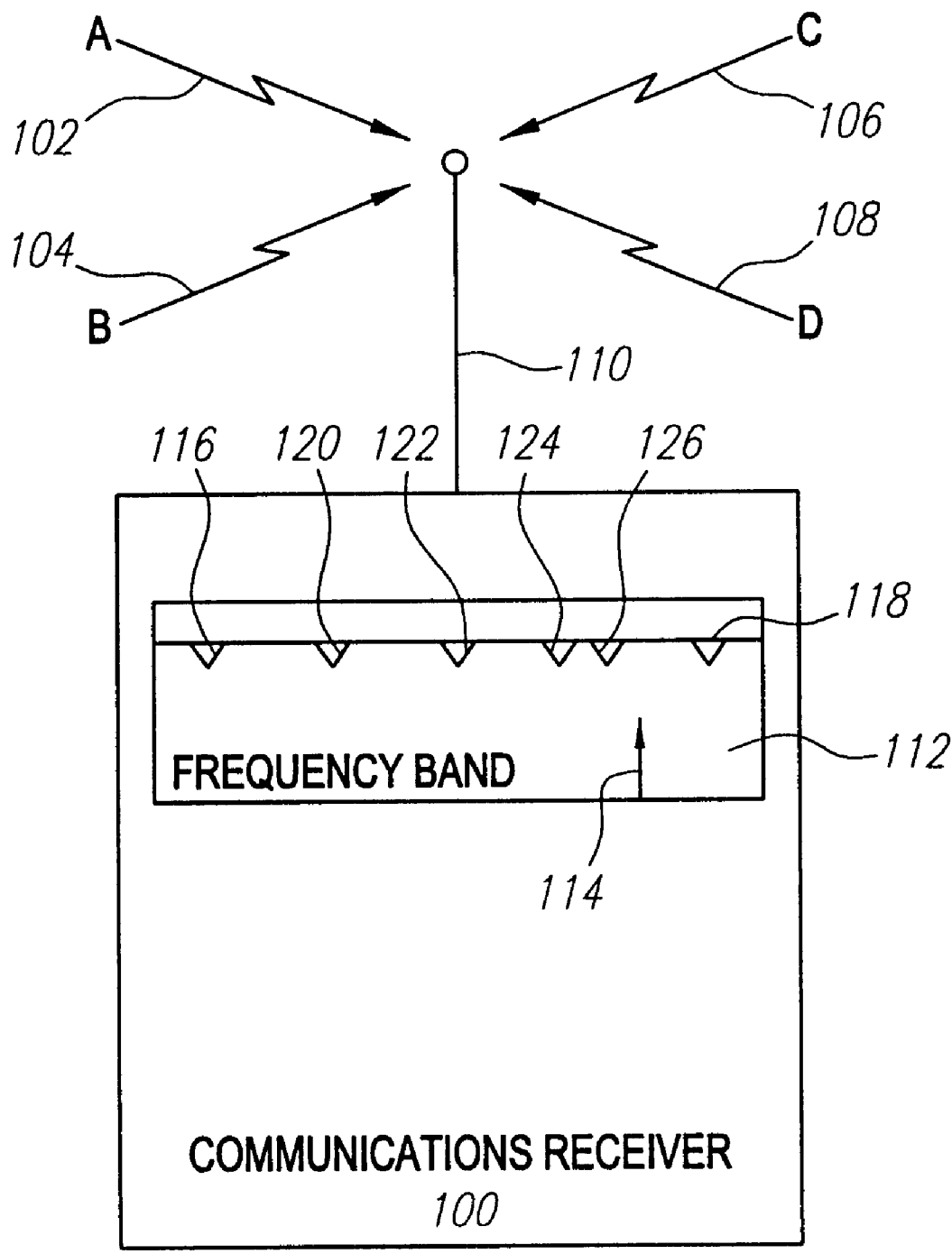
FIG. 1 is a prior art graphical illustration of a communications receiver optimizing the power consumption.

FIG. 1 is a prior art graphical illustration of a communications receiver optimizing power consumption. A communications receiver 100, receives four broadcasts, comprising signal A 102, signal B 104, signal C 106, and signal D 108, at an antenna 110. The communications receiver 100, has a frequency band selector 112. Utilizing the selector 114, an operator of the communications receiver 100 may select a broadcast frequency between a lower frequency limit 116 and an upper frequency limit 118, by position the selector 114. In this manner broadcast frequencies A 102, B 104, C 106, or D 108 may be selected by positioning selector 114 on the points of the frequency band selector representing the broadcast frequencies A 102, B 104, C 106, or D 108 (e.g. positions 120, 122, 124 or 126, respectively). The communication receiver 100 receives and amplifies a frequency band between the lower frequency limit 116 and an upper frequency limit 118, and may select a target broadcast, for example signal A 102, B 104, C 106, or D 108.

Figure 2:
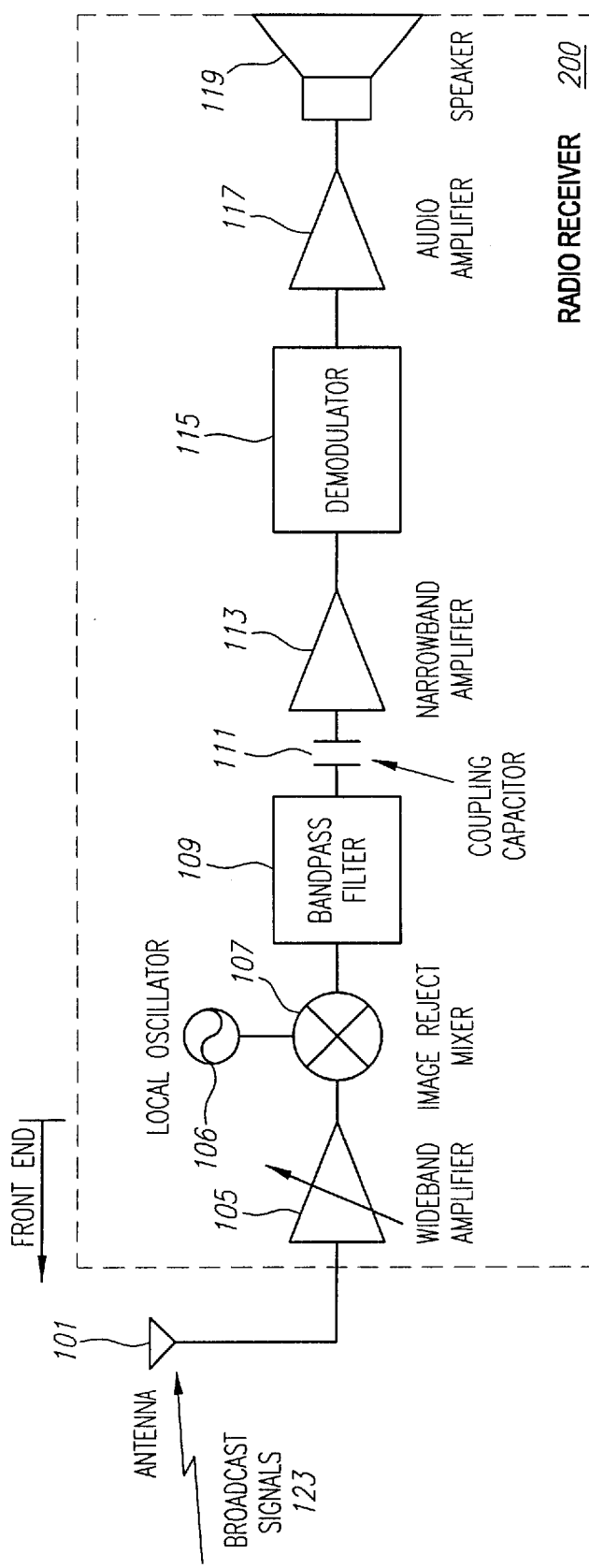
FIG. 2 is a prior art block diagram of the circuitry of a communications optimizing power consumption.

FIG. 2 is a block diagram of the circuitry of a radio receiver 200. An antenna 101 receives broadcast signals 123, that are then passed to a wide-band amplifier 105. The frequencies amplified by the wide-band amplifier 105 may represent different channels that the receiving unit is capable of receiving. After a signal is amplified in the wide-band amplifier 105, the amplified signal is passed to an image rejection mixer 107. The image rejection mixer 107 accepts the signal from the wide-band amplifier 105 and multiplies it with a frequency from a local oscillator 106, in order to translate the received signal to a lower frequency. The image rejection mixer 107 rejects one of the image frequencies produced by the mixing process.

The translated frequency from the image rejection mixer 107 is then passed to a band-pass filter 109 that may be used to select the desired individual broadcast signal to be received. By selecting a individual broadcast signal and mixing it with a local oscillator signal, thereby translating it to a frequency that may be used by the narrow-band amplifier, the individual broadcast signal is acquired. The filtered signal from the band-pass filter 109 is then coupled through the coupling capacitor 111 and provided to the narrow-band amplifier 113. The narrow-band amplifier 113 may then amplify the desired signal. The narrow-band amplifier 113 may be designed to be able to amplify the bandwidth of the selected communications channel. Conversely, the wide-band amplifier 105 may be designed to concurrently amplify a much wider bandwidth of signals to include several channels.

The output of the narrow-band amplifier 113 is coupled into the demodulator 115, which extracts the information from the signal coupled into it. The output of the demodulator 115, such as an audio signal, is then coupled into an audio amplifier 117. The output from the audio amplifier 117 is then connected to a speaker 119 to generate sounds for perception by users.

The gain of the wide-band amplifier 105 may be fixed or controlled by an automatic gain control (AGC). If the gain of the wide-band amplifier is fixed, the gain will be selected at a high enough value so that weak signals might be effectively amplified, yet at a low enough value so that strong signals will not saturate the amplifier. If the gain is set by an AGC circuit, then the amplifier may attempt to regulate the amplification in such a way that the maximum amplification may be applied without distorting the signal coupled to it. An AGC circuit may commonly attempt to achieve maximum amplification without distorting the signal coupled into it, for example, by maintaining the largest signal in its band at a point just below the point where the signal would distort. In other words, the AGC commonly functions by measuring the largest signal within the band-pass of the amplifier and trying to maintain the signal at an amplitude less than an amplitude that may cause distortion. One of the difficulties is that an AGC commonly may measure the strongest signal within the band and not necessarily the signal that is the selected signal of interest.

Figure 3:
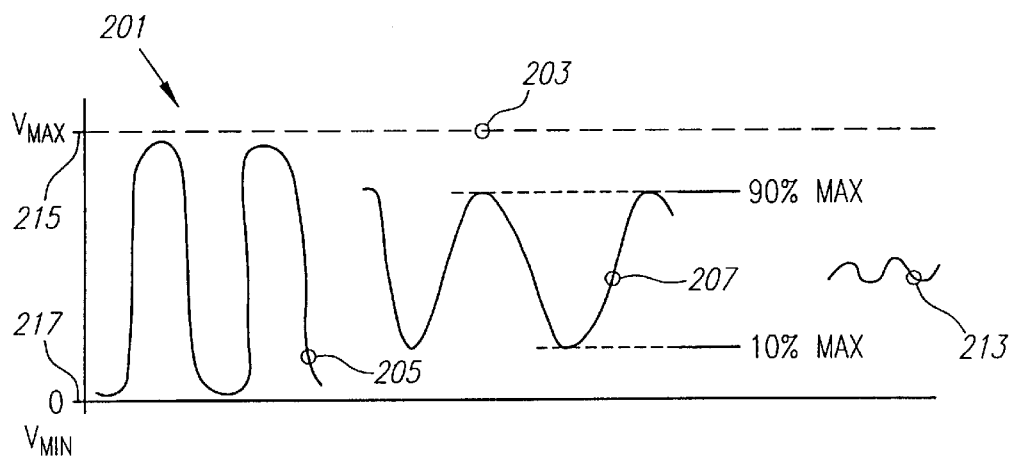
FIG. 3 contains graphs of maximum linearity and maximum gain signals for different amplifier power supply levels.
Figure 3:
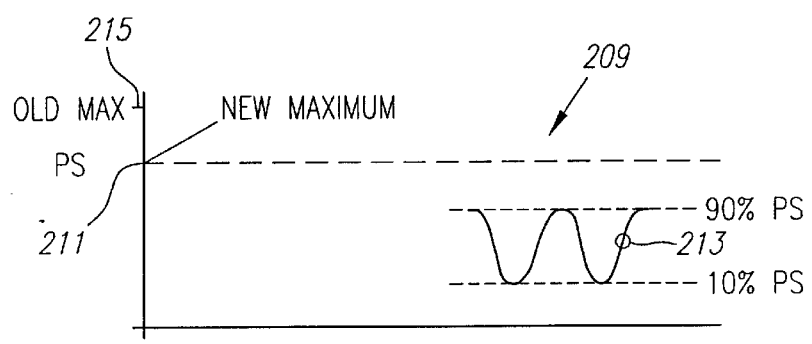

FIG. 3 illustrates the amplification and distortion of signals. The graph 201 depicts a signal 205 that is being output from an amplifier, such as a wide-band amplifier. The signal 205 is approaching the limit of the output range of the amplifier. Typically the output range of such an amplifier is limited by it's power supply. In the illustrated graph 201, the power supply voltage of the amplifier is $V_{MAX}$ 215. The amplified waveform 205 approaches the $V_{MAX}$ limit within a few percent. As excursions of the waveform 205 approach $V_{MAX}$ 215, the waveform 205 is distorted by the amplifier. The result of amplifying a waveform approaching the power supply limits of an amplifier is nonlinearity of the resultant signal 205. The resulting amplified signal may become nonlinear because, in the regions near the maximum and minimum power supply voltages, the amplifier is nearing its saturation or cutoff regions and the gain of the amplifier is decreasing. An amplifier's characteristics are commonly substantially non-linear in the operating regions near saturation and cut off.

If the amplitude of the waveform is reduced so that the output waveform excursions no longer approach the limits of the amplifier power supply, the waveform may be linearly amplified similar to waveform 207. The excursion of the waveform 207, between 10% and 90% of the power supply voltage $V_{MAX}$ 215, is in the linear operation region of the amplifier. The maximum value of the signal does not approach the power supply voltages $V_{MAX}$ 215 or $V_{MIN}$ 217. Therefore, the waveform 207 may be undistorted as shown in FIG. 2. The illustrative waveform 207 occupies the full undistorted range of the amplifier, and hence the waveform 207 is amplified linearly. In contrast, a waveform may occupy only a relatively small portion of the possible of the possible peak to peak amplitude. Such a waveform, which occupies only a relatively small portion of the maximum amplifier range, is shown as waveform 213. The waveform 213 may occupy less than a full range output range of the amplifier, either because the amplifier cannot amplify it further or because a signal of the magnitude of waveform 213 is all that is needed to drive the next stage of amplification. If the signal 213 occupies only a relatively small range of the amplifier's capability, then there may be nothing to be gained by having a range of $V_{MAX}$ 215 for a power supply voltage. The power supply voltage may be reduced, as shown in graph 209, and the amplified waveform 213 may range between 10% and 90% of the reduced power supply voltage 211 and be amplified without distortion. By reducing the power supply voltage in this manner, the power consumed by the amplifier is reduced, but the signal quality may remain the same, that is undistorted.

Figure 4:
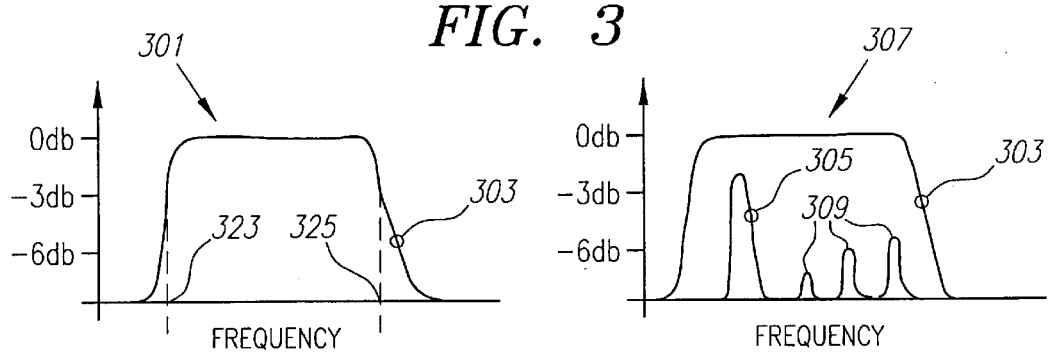
FIG. 4 is a group of graphical representations, of example of illustrative signals that may be within the amplification band of a wide band amplifier.
Figure 4:
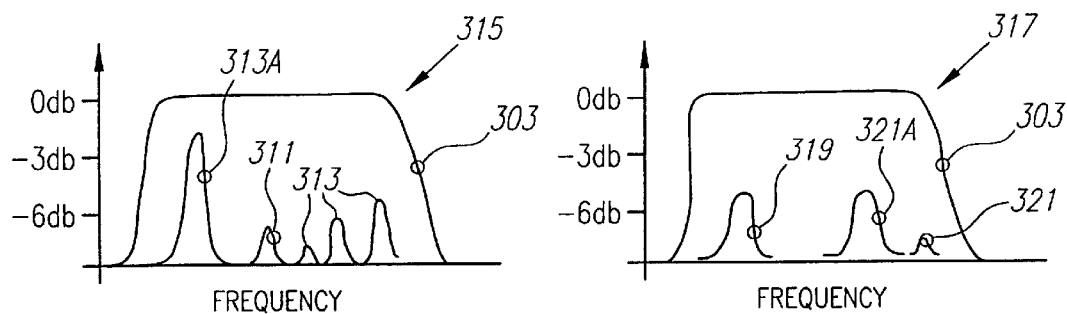

FIG. 4 contains graphical representations of example signal environments that may be encountered within a communication receiver. The target signal, which is the signal selected to be received, may be a strong signal requiring little amplification or it may be a weak signal requiring maximum amplification. Even if maximum amplification is applied to the target signal, the target signal may be so weak that the full dynamic range of the amplifier cannot be used, i.e. the target signal may be so weak that it may only be amplified to the point where it occupies part of the dynamic range of the RF input amplifier. The target signal may be such a predominating signal that other signals in the band may be ignored as negligible. The target signal may also be of an intermediate strength when compared to other signals in the band. That is, the target signal may be of a similar magnitude as non target signals within the amplification band of the wide-band RF amplifier.

A wide-band amplifier may be defined as an amplifier that may amplify a wide band of RF signals, consisting of more than one simultaneous broadcast signal. Many examples of communications equipment have a first stage of amplification that is a wide-band amplifier. As an example, a modem FM radio may receive a 20 MHz bandwidth from approximately 88 MHz to 108 MHz. To amplify signals received in this 20 MHz bandwidth, a wide band amplifier may be utilized. A wide band amplifier, generally will amplify all signals within its bandwidth. Individual broadcast signals of FM stations occupy significantly less than the 20 MHz FM bandwidth, so many individual FM stations may transmit within the 20 MHz FM bandwidth. Individual broadcast signals of FM stations may be selected by multiplying the 20 MHz FM bandwidth with a local oscillator signal. The local oscillator signal will translate all of the RF frequencies within the bandwidth of the wide band and then couple the resultant signal band into a narrow band amplifier. By selecting the local oscillator frequency of different broadcast signals, individual FM stations may be selected from the FM band and translated into the bandwidth of a narrow-band amplifier, e.g. narrow-band amplifier 113. The narrow band amplifier, which generally has a bandwidth limited so as to amplify only one broadcast signal, will then amplify only the selected broadcast signal.

FIG. 4 illustrates a situation similar to the FM band example, where a wide-band frequency range may contain several individual transmission signals within the wide-band range. For purpose of illustration, all the figures will be discussed relative to the illustrative communication receiver arrangement of FIG. 2.

In FIG. 4, graph 301 illustrates the frequency response of Band-Pass Amplifier 105. A band-pass amplifier is generally considered to have a band-pass limited by 3 dB points at the higher frequency and lower frequency ends of the band-pass amplifier's response curve. Band-pass amplifier s 105 response is illustrated by curve 303 in graph 301, with 3 dB points shown at 323 and 325. The curve 303 in graph 301 is reproduced in graphs 307, 315, and 317, in order to illustrate that the individual broadcast signals (305, 309, 311, 313, 313A, 319, 321 and 321A) are within the band-pass of the wide-band amplifier's response curve 303.

The graphs 307, 315, and 317 represent three different signal environments. The three different signal environments are used to illustrate how the operation of a wide-band amplifier 105 may be altered to better accommodate the conditions present. The graphs represent several individual broadcast signals, within the bandwidth of the wide-band amplifier 105. In each graph one desired target signal and one or more undesired, or interference signals, are depicted. The relative strength of the signals depicted in the graphs of FIG. 3 are reflected in each signal's amplitude on the y axis of the graphs.

In graph 307, the signal represented by waveform 305 is the desired target signal. In addition to the target signal there are three other undesired or interference signals 309. The undesired signals may represent noise, i.e. jamming signals, or other individual transmission signals that are not selected to be received. The desired signal 305 is significantly stronger than the undesired signals 309. In this case, the amplification of the wide-band amplifier 105 could be increased until the onset of distortion of waveform 305 was detected. Because the desired signal is the strongest in the band of signals being received by the wide-band amplifier, it would be the limiting signal. The limiting signal in this case is the signal with the greatest amplitude. It is also the signal that needs to be amplified as much as possible without distortion. If the signal environment were as portrayed in graph 307, then the amplification of the wide-band amplifier 105 could be increased until the onset of distortion within the amplifier were detected. When the onset of distortion were detected, it could be correctly assumed that the maximum amplification for the given environment had been applied.

In graph 315 the target signal 311 is significantly smaller than unwanted signal 313A. Signal 313A is the largest signal present within the bandwidth 303 of the wide-band amplifier 105. In the signal environment illustrated in graph 315, if the amplification of the wide-band amplifier 105 were increased until the onset of distortion was detected, the target signal 311 would not have the maximum amplification possible. This is because the onset of distortion would be detected in the undesired signal 313A and the gain of the wide-band amplifier 105 would be limited at that point. Because the target signal 311 is significantly smaller than an undesired signal 313A, limiting the wide-band amplifier 105 gain when signal distortion is detected will prevent the target signal 311 from being fully amplified. However, the gain of the wide-band amplifier 105 may be increased to the point where the unwanted signal 313A is not only distorted, but is on the edge of saturation, similar to signal 205 in graph 201. In that case, the desired signal 311 will receive greater amplification, as compared to a case where the gain had been restricted to the point where the onset of distortion was detected. In the signal environment portrayed in graph 315 the amplifier gain should not be limited to the point where the onset of distortion were detected, the amplification should be limited only at the point where the onset of saturation were detected.

In paragraph 317, a third signal environment is illustrated where the desired signal 319 and the undesired signal 321A are of then approximately the same amplitude. In the signal environment in graph 317, the target signal 319 is of the same order of magnitude as the unwanted signal 321A. If the gain of the wide-band amplifier 105 is increased until distortion is detected the maximum gain may not be applied to the target signal. Conversely, if the gain of the wide-band amplifier 105 were to be increased to the point where the onset of saturation were detected, the targeted signal might be distorted and the performance of the receiver degraded. The control algorithms previously applied to the environments depicted in graphs 307 and 315 may result in degraded performance in the signal environment illustrated in graph 317. If the gain of wide-band amplifier 105 is increased, it may only be increased up to the point where nonlinearity is detected in the target signal 319, that would have to be monitored at the narrow-band amplifier 113. In addition to monitoring for distortion of the target signal 319 at the output of the narrow-band amplifier 113, the wide-band amplifier 105 would have to be monitored for the onset of saturation. The wide-band amplifier 105 must always be kept from saturating or all the signals being amplified by it will be affected, not merely the signal that is causing the saturation.

Thus, there are three distinct circumstances presented. First, when the desired target signal is the largest signal, the gain of the wide-band amplifier may be increased until distortion is detected. Since the onset of distortion will be detected in the desired signal, the target signal will receive the maximum amplification without distortion.

Second, when the desired signal is much smaller than the interfering signals, the wide-band amplifier 105 may be adjusted for increasing gain until the onset of saturation is detected in the wide-band amplifier 105. In the case where the desired signal is significantly smaller than undesired signals, the amplification could be increased until the onset of saturation was detected. At the point where saturation was detected, there could be distortion introduced into a plurality of signals in the band. Since the desired target signal is significantly smaller than the undesired signals, the target signal would not be distorted and would receive maximum amplification.

Third, when the desired target signal and the undesired signals are of the same order of magnitude, a two step process is required. This is because the target signal is not easily determinable whether the desired signal is the largest signal. If the desired signal is the largest signal, the amplification may be increased until the onset of saturation is detected in the wide-band amplifier 105 or until distortion is detected of the desired signal in the narrow-band amplifier 113 is detected, whichever occurs first. Since it cannot be predicted whether the onset of saturation will be detected or distortion will be detected in the target signal first, both must be monitored and the gain of the wide-band amplifier 105 limited to the point where the first one occurs. Since the desired target and undesired signals are of the same general magnitude the target signal must be monitored, in the narrow-band amplifier 113, to insure that, when the onset of distortion is detected in the wide-band amplifier, it is not the target signal that is being distorted.

In order to use the above described signal magnitude information to improve the performance of the receiver system, the onset of amplifier non-linearity and saturation must be detected. To detect amplifier saturation and distortion operating parameters such as current drawn by the amplifier, voltage excursions of amplifier waveforms, and amplifier power may be detected. There are a variety of ways to detect saturation or non-linearity of the target signal, such as by measuring the current used by an amplifier, voltage excursions of amplifier waveforms, and by measuring amplifier power. Various electronic apparatus for producing measurements of amplifier voltage, current, and power are illustrated in FIG. 5.

Figure 5:
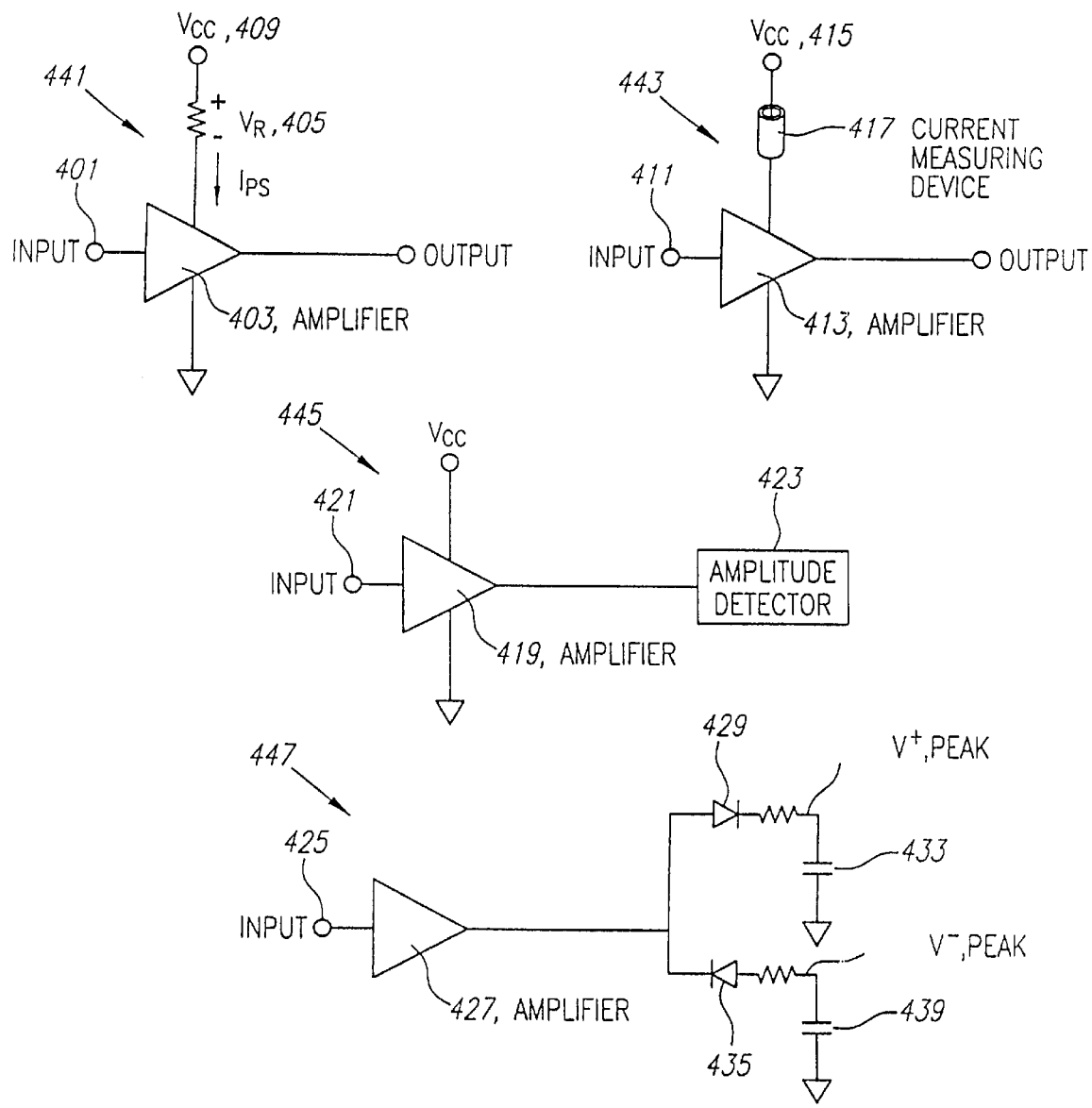
FIG. 5 is a series of circuit schematics illustrating several methods of measuring amplifier parameters.

To detect current being drawn by an amplifier, a scheme such as the one illustrated at 441 of FIG. 5, may be employed. A low value sensing resistor $V_R$ 405 may be inserted in series with the amplifier power supply $V_{CC}$ 409. The power supply current $I_{PS}$ consumed by the Amplifier 403 will be proportional to the voltage developed across the low value sensing resistor $V_R$ 405. Because the voltage of the power supply may also be known, the power consumed in the amplifier may be determined. To detect the onset of non-linearity within an amplifier the amplification, or the magnitude of the Input 401 may be changed and the resulting current drawn observed. The ratio of amplification change to the change in current drawn may then be used by some type of Digital Control Unit (DCU), such as a microprocessor, or microcomputer, state machine or the like to calculate the onset of non-linearity and saturation using standard techniques known in the art.

Another scheme to detect current being drawn by an amplifier is illustrated at 443 in FIG. 5. A current measuring device 417, such as a hall effect device, may be placed so that all the current entering the amplifier 413 will be directed by the sensor. The power supply current $I_{PS}$ consumed by the amplifier 413 may be detected by a current sensing device 417. Because the voltage of the power supply is known, the power consumed in the amplifier may also be ascertained. To detect the onset of nonlinearity, the amplification of the amplifier or the magnitude of the input 411 may be changed and the resulting current drawn by the amplifier observed. The ratio of amplification change to the change in current drawn may then be used by a digital control unit (DCU), such as a microprocessor, or microcomputer, state machine or the like, to calculate the onset of nonlinearity and saturation using standard techniques known in the art.

To detect output voltage excursions of an amplifier, a scheme as illustrated at 445 in FIG. 5, may be used. The input 421, or the gain of the amplifier 419, may be varied. By observing the change in the amplitude of the output waveform with an amplitude detection circuit 423, the onset of saturation or amplitude non linearity may be calculated.

Another scheme to detect the output voltage excursions of the output of an amplifier is illustrated at 447 in FIG. 5. The input 425, or the gain of the amplifier 427, may be varied and the change in the amplitude of the output waveform may be observed. By detecting a positive peak, $V^+_{PEAK}$, using diode 429, and capacitor 433, and a negative peak, $V^-_{PEAK}$, using diode 435, and capacitor 439, signal amplitude and hence the onset of saturation or signal non linearity may be detected.

Figure 6:
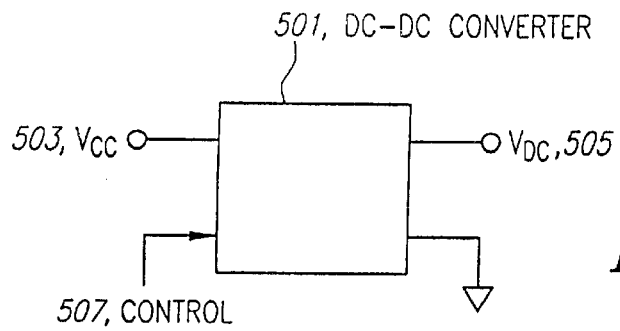
FIG. 6 is a block diagram illustrating the function of a DC to DC converter.

Another method of detecting the onset of distortion and saturation in an amplifier employs a variable level power supply. A variable level power supply might be in the form of the DC-DC converter. FIG. 6 illustrates a DC-DC converter 501, such as might be used in detection of saturation and distortion of an amplifier. The DC-DC converter 501 may be connected to a power supply $V_{CC}$ 503. A Control Signal 507 may then control the DC output $V_{DC}$ 505. The DC output $V_{DC}$ 505 would then be used as a power supply for the amplifier. The DC level could be controlled by a Digital Control Unit ("DCU") that would measure amplifier parameters such as output voltage swing of the amplifier or the current drawn by the amplifier. The onset of distortion or saturation could then be detected by the DCU.

As DC to DC converters increase in efficiency, they may be employed in changing the amplifier supply voltage not only to check circuit parameters and detect the onset of conditions such as distortion and saturation, but as a method of more efficiently operating the amplifier. By limiting the supply voltage to the minimum level that is necessary to achieve the proper amplifier performance, power may be saved. For example in FIG. 3, if the maximum amplification of a signal produces a signal 213 as illustrated in graph 201, the amplified signal will be using only a relatively small portion of the amplifier's range. If the power supply voltage is reduced, for example using a DC-DC converter, then the situation in graph 209, where the signal 213 uses most of the linear operating region of the amplifier, may be obtained. Since the signal 213 is being amplified in linear operating regions of the amplifier, the reduction of the power supply voltage does not adversely affect the quality of the signal 213. However, in graph 209, where the power supply voltage has been reduced, the power consumed by the amplifier is also reduced.

Figure 7:
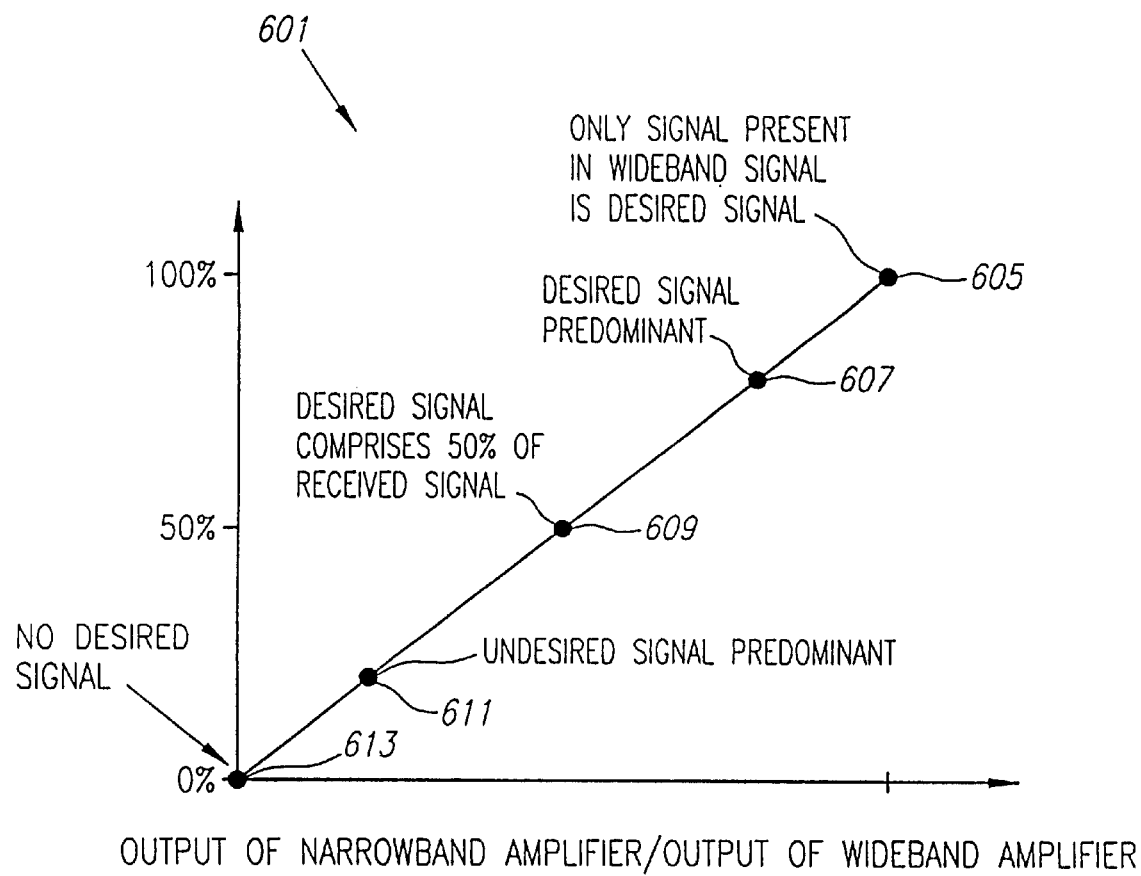
FIG. 7 is a graph illustrating the relationship between the ratio of narrow-band power and wide-band power versus the amount of desired signal present within a wide-band signal.

FIG. 7 contains a graph 601, illustrating the relationship between the ratio of narrow-band amplifier 113 output and the wide-band amplifier 105 output versus the amount of desired target signal present within a wide-band signal. The vertical axis of the graph represents the portion of the wide-band signal that is represented by the desired target signal. For example, at point 605, the desired signal makes up 100% of the wide-band amplifier signal. At point 609, the desired signal makes up 50% of the wide-band amplifier signal. At point 613, the desired signal makes up 0% of the wide-band amplifier signal, i.e. it is not present. This ratio of desired signal to spurious signal may be used in order to control characteristics of a wide-band amplifier in a communications system to optimize performance.

Figure 8:
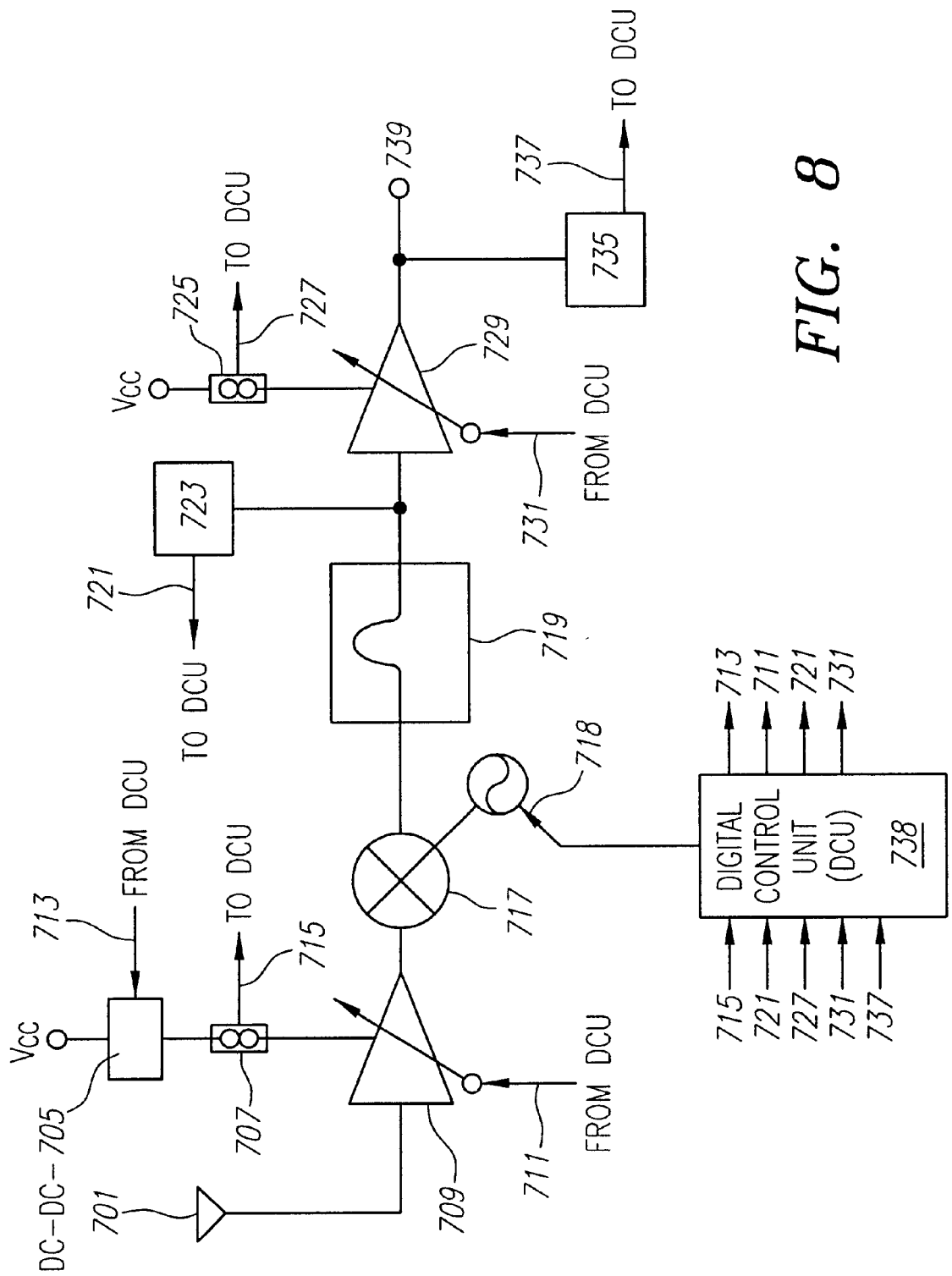
FIG. 8 is a block diagram of an embodiment showing several variations in elements.

FIG. 8 is an illstration encompassing several preferred embodiments of the invention. Signals are received by the antenna 701, and then passed to a wide-band amplifier 709. The current sensor 707 measures the current that is being supplied to the wide-band amplifier 709. The current sensor 707 measures the current that is being supplied to the wide-band amplifier 709 from a DC to DC converter 705. The measurement 715 is then passed to the digital control unit ("DCU") 738. The band of frequencies from the wide-band amplifier 709 is then provided to a mixer 717, where it is combined with a frequency 718 from a local oscillator 718, and then provided to a narrow-band filter 719. The frequency provided to the mixer 717 is controlled by the DCU 738 and adjusted so that the narrow-band Filter 719 passes only the frequency containing the broadcast channel desired. The output of the narrow-band Filter 719 is passed to a narrow-band amplifier 729, and the narrow-band amplifier receives an input from the DCU 738 via path 731. The narrow-band amplifier 729 provides its output signal to an output 739, which is also tapped off via measurement unit 735 to the DCU 738 through path 737. The output of the narrow-band filter 719 is also passed to a peak-to-peak measurement unit 723. The peak-to-peak measurement unit 723 is passed to the DCU 738 via a signal 721.

The DCU 738, may then accept the measurement from the peak to peak measurement unit 723 and compare it to the measurement 715 from the current sensor 707, in order to establish a signal ratio of desired signal to total signal present in the wide-band amplifier 709. If the signal ratio is greater than a certain level, illustrated as point 607 in FIG. 7, then the desired signal is predominant. Where the desired signal is predominant, the DCU 738 may increase the gain of the wide-band amplifier 709, until the onset of distortion in the wide-band amplifier 709, is detected. If the narrow-band amplifier 729 cannot handle any more signal input without distortion, then nothing is gained by increasing the gain of the wide-band amplifier 709. Thus, the signals may be as illustrated by waveform 213, in Graph 201 of FIG. 3. The signal amplitude may not typically be increased without overloading the narrow-band amplifier 729. If the amplification of the incoming signal cannot be increased, the wide-band amplifier power supply may be decreased without affecting the amplification of the desired signal. The voltage of the DC-DC Converter 705 may be decreased without affecting the amplification of the desired signal. The DCU 738 may use control line 713, from the DCU 738, to command the DC-DC Converter 705 to lower the wide-band amplifier 709 power supply voltage until the measurement at the Current Sensor 707 detects the beginning of the onset of non-linearity. Where the onset of nonlinearity is detected, the wide-band amplifier 709 power supply voltage may not be lowered without sacrificing the quality of the desired signal.

If the signal ratio is past a certain level as illustrated in point 611 in FIG. 7, then the undesired signals are predominant. Where the undesired signals are predominant, the signals may be as illustrated in graph 315 of FIG. 4. The DCU 738 may use control line 711 from the DCU 738 to increase the gain of the wide-band amplifier 709. When the measurement at the Current Sensor 707 detects the beginning of the onset of non-linearity, it is an unwanted signal, e.g. 313A, that is being distorted. Thus, the gain of the wide-band amplifier 709 may be increased until the onset of saturation is detected. At the point where the wide-band amplifier 709 begins to saturate, the gain of the wide-band amplifier 709 may not be increased without adversely affecting all signals being amplified. However, where an unwanted signal is being distorted, is of little consequence and the wide-band amplifiers 709 amplification of the desired signal improves the performance of the system.

If the signal ratio exceeds a certain level as illustrated in point 611 in FIG. 7, but is less than a certain level illustrated as point 607, then the undesired signals are of the same order of magnitude as the desired signal. Thus, the signals may be as illustrated in graph 317 of FIG. 4. Since the desired signal and the undesired signal are similar in value, both the onset of saturation in the wide-band amplifier 711 and the onset of distortion in the narrow-band amplifier 729 will need to be monitored. The gain of the wide-band amplifier 711 may be increased until detection of either the onset of saturation in the wide-band amplifier 709 or the onset of distortion in the narrow-band amplifier 729. If the signal passed to the narrow-band amplifier 729 is at a maximum level, then power supply 705 of the wide-band amplifier 711 may be decreased until detection of either the onset of saturation in the wide-band amplifier 711 or the onset of distortion in the narrow-band amplifier 729. Where the power supply of the wide-band amplifier 709 is reduced until the onset of distortion is detected in the wide-band amplifier 709, the desired signal may be monitored for distortion by monitoring the signal into the narrow band amplifier 729 via the peak to peak signal monitor 723, or by monitoring the current signal 727 of the current sensor 725. The current signal 727 represents the current being supplied to the narrow-band amplifier 729 and may be used to detect the onset of signal nonlinearity.

While various embodiments of the application have been described, it will be apparent to those of ordinary skill in the art that many more embodiments and implementations are possible that are within the scope of this invention. Accordingly, the invention is not to be restricted except in light of the attached claims and their equivalents.

What is claimed is:

1. A method of improving performance in communications receivers, the method comprising:
   selecting an individual broadcast signal;
   measuring an output of a wide-band amplifier that is amplifying the individual broadcast signal;
   passing the individual broadcast signal after amplification by the wide-band amplifier to a narrow-band amplifier;
   measuring an output of the narrow-band amplifier;
   computing a ratio of the narrow-band amplifier output to the wide-band amplifier output; and
   adjusting amplification of the of wide-band amplifier based on the ratio of the narrow-band amplifier output to the wide-band amplifier output.

2. A method of claim 1, further comprising:
   comparing the ratio of the narrow-band amplifier output to the wide-band amplifier output to a preset value; and
   adjusting the wide-band amplifier for maximum gain consistent with linearity of the wide-band amplifier if the ratio of the narrow-band amplifier output to the wide-band amplifier output is greater than the preset value.

3. A method of claim 1, further comprising:
   comparing the ratio of the narrow-band amplifier output to the wide-band amplifier output to a preset maximum value; and adjusting the wide-band amplifier for maximum gain, consistent with non-saturation of the wide-band amplifier, if the ratio of the narrow-band amplifier output to the wide-band amplifier output is less than the reset maximum value.

4. A method of claim 1, further comprising:

comparing the ratio of the narrow-band amplifier output to the wide-band amplifier output to a preset range; and if the ratio of the narrow-band amplifier output to the wide-band amplifier output falls within the preset range then adjusting the wide-band amplifier for increased gain, until either a maximum gain, without saturation of the wide-band amplifier, is reached or until an onset of nonlinearity, in the narrow-band amplifier, is detected.

5. A method of improving performance in communications receivers, comprising:

selecting an individual broadcast signal;

increasing a gain of a wide-band amplifier until a maximum signal input to a narrow-band amplifier is obtained; and decreasing a power supply voltage of the wide-band amplifier until an occurrence of saturation is detected in the wide-band amplifier or nonlinearity is detected in the narrow-band amplifier.

6. An apparatus, for improving the performance in communication systems, receiving individual broadcast Radio Frequency (RF) signals, the communications system including a wide-band RF amplifier coupled to a narrow-band amplifier, the apparatus comprising:

means for selecting an individual broadcast signal;

means for measuring the output of the wide-band RF amplifier that is amplifying the individual broadcast signal;

means for passing the individual broadcast signal after amplification by the wide-band RF amplifier to a narrow-band amplifier;

means for measuring the output of the narrow-band amplifier;

means for computing a ratio of the narrow-band amplifier output to the wide-band RF amplifier output; and means for adjusting the amplification of the of wide-band RE amplifier based on the ratio of the narrow-band amplifier output to the wide-band RE amplifier power.

* * * * *

UNITED STATES PATENT AND TRADEMARK OFFICE
CERTIFICATE OF CORRECTION

PATENT NO. : 6,651,021 B1
DATED : November 18, 2003
INVENTOR(S) : Underbrink et al.

It is certified that error appears in the above-identified patent and that said Letters Patent is hereby corrected as shown below:

Column 11,
Line 5, delete "reset" and insert -- preset --.

Column 12,
Line 20, delete "RE" and insert -- RF --.
Line 21, delete "RE" and insert -- RF --.

Signed and Sealed this

Sixteenth Day of March, 2004

JON W. DUDAS
*Acting Director of the United States Patent and Trademark Office*